June 16, 1953     R. M. CONKLIN ET AL     2,642,086
LOADING VALVE AND METHOD OF CONTROLLING FLUID FLOW
Filed Feb. 21, 1950     2 Sheets-Sheet 1
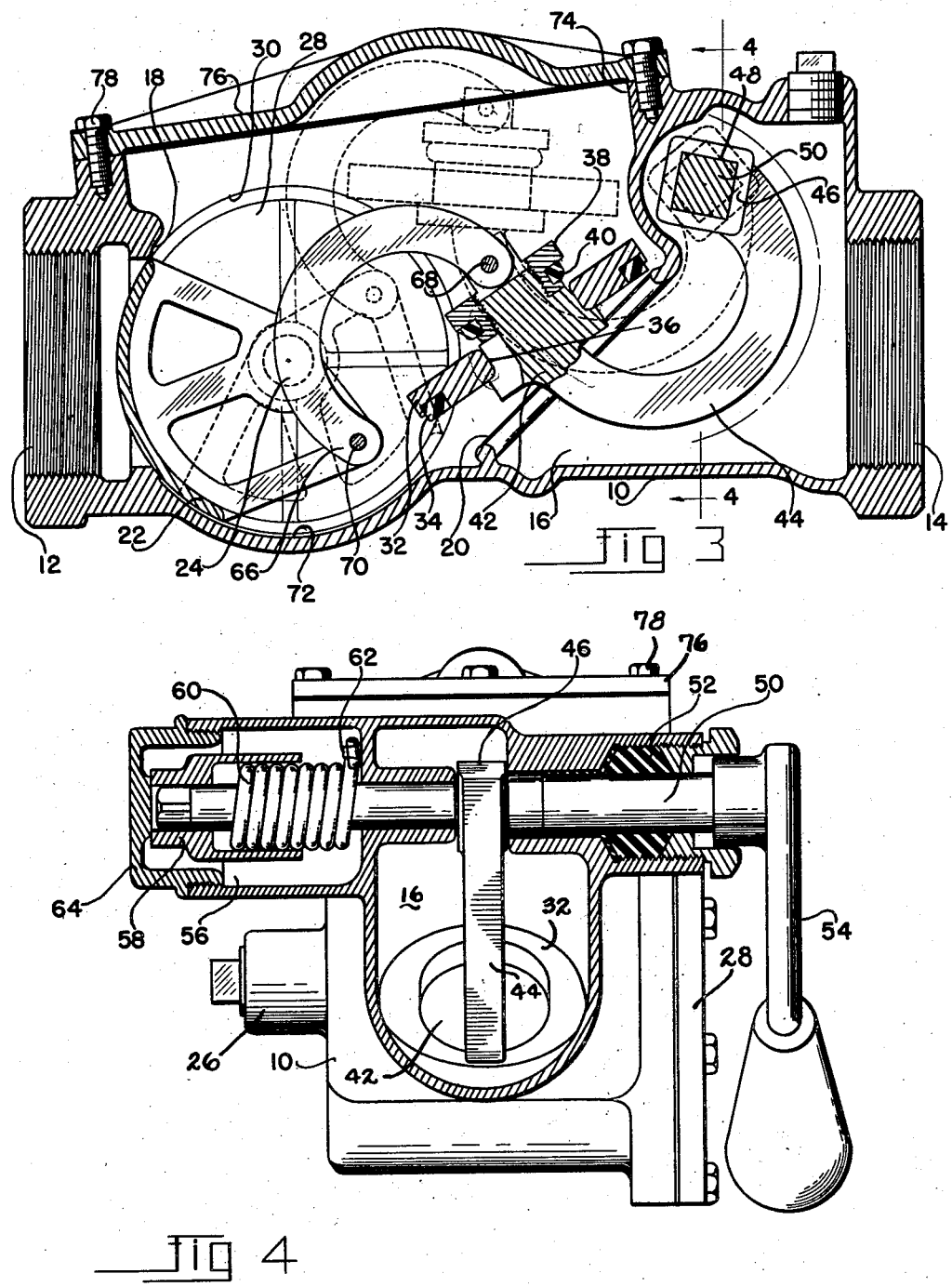
INVENTORS
ROBERT M. CONKLIN
HAROLD W. HERRING
Toulmin & Toulmin
ATTORNEYS June 16, 1953    R. M. CONKLIN ET AL    2,642,086
LOADING VALVE AND METHOD OF CONTROLLING FLUID FLOW
Filed Feb. 21, 1950    2 Sheets-Sheet 2

INVENTORS
ROBERT M. CONKLIN
HAROLD W. HERRING
By Toulmin & Toulmin
ATTORNEYS

Patented June 16, 1953

2,642,086

UNITED STATES PATENT OFFICE 2,642,086

LOADING VALVE AND METHOD OF CONTROLLING FLUID FLOW

Robert M. Conklin, Columbus, and Harold W. Herring, Linworth, Ohio, assignors, by mesne assignments, to Buckeye Iron & Brass Works, Dayton, Ohio, a corporation of Ohio Application February 21, 1950, Serial No. 145,352

3 Claims. (Cl. 137—630.14)

1

This invention relates to loading valves, and particularly to a loading valve for controlling the flow of liquid fuel in connection with the operation of service stations, bulk fuel plants, airports, and the like.

The present-day volume of liquid fuel transported in commerce has brought about the development of large fuel carriers, and because of this, it has become increasingly desirable to load liquid fuels into such carriers at higher rates of flow than have heretofore been contemplated, or, in fact, possible.

In connection with airports and the like, a similar situation has arisen in connection with the fueling of large planes, it being important to accomplish this fueling in the shortest possible time.

One of the particular problems encountered with dispensing liquid fuels and the like at high rates of speed is that it becomes necessary to cut off the fuel flow rather quickly, and with valves that have heretofore been manufactured and marketed, the rapid closing of the valve causes a hydraulic force to build up which not only causes the valve to slam shut, but also results in high pressure surges reflecting back through the supply system. Pressure surges of this nature cause hammering effects and have a tendency to damage equipment in the pipe line such as meters, valves, and other mechanisms, and also impose severe strains on the connections in the pipe line.

A further drawback encountered with the valves of the prior art which tend to slam shut is that the hydraulic force acting on the valve to urge it closed increases rapidly as the valve member reaches its closed position, thereby making it difficult for the valve to be closed at a uniform rate, and also requiring a high force to be exerted on the valve in order to open it.

The nature of the service to which a loading valve of this type is put is such that an absolute minimum of leakage can be tolerated, and this has led to the use of a clapper or poppet type valve with the valve member positioned on the upstream side of the valve seat so that when the valve is closed the pressure in the system will hold it tightly against the valve seat.

A valve of this type is characterized by opening very quickly, and this introduces a certain difficulty in connection with the operation of a loading valve, because when a certain quantity of fluid is being dispensed, it is generally necessary to reduce the rate of fluid flow when the dispensed quantity approaches the desired amount, and then to complete the dispensing at a reduced rate. This is generally spoken of as "topping off" and must be accomplished by restricting the fluid flow through the loading valve. With the clapper or poppet type valve,

2 this is not readily accomplished due to the rapid opening characteristics of this type of valve mechanism.

Having the foregoing in mind, the primary object of the instant invention is to provide a loading valve arrangement which overcomes the foregoing difficulties.

A particular object of the present invention is to provide a valve and a method of operating a valve so that a quick opening and closing valve is had, but in which all tendency for the operation of the valve to create pressure surges and hammers in the supply line is eliminated.

Another object is the provision of a loading valve which can easily be manipulated between its opening and closing position.

A further object of this invention is the provision of a loading valve and a method of operation such that the valve will close tightly and prevent all leakage, but at the same time any tendency for the valve to hammer or be difficult to operate is eliminated.

These and other objects and advantages will become more apparent upon reference to the following description taken in connection with the accompanying drawings, in which:

Figure 3 is a view like Figure 2 but showing the valve partly open; and

Figure 4 is a vertical transverse section indicated by line 4—4 on Figure 3.

*General arrangement*

Figure 1:
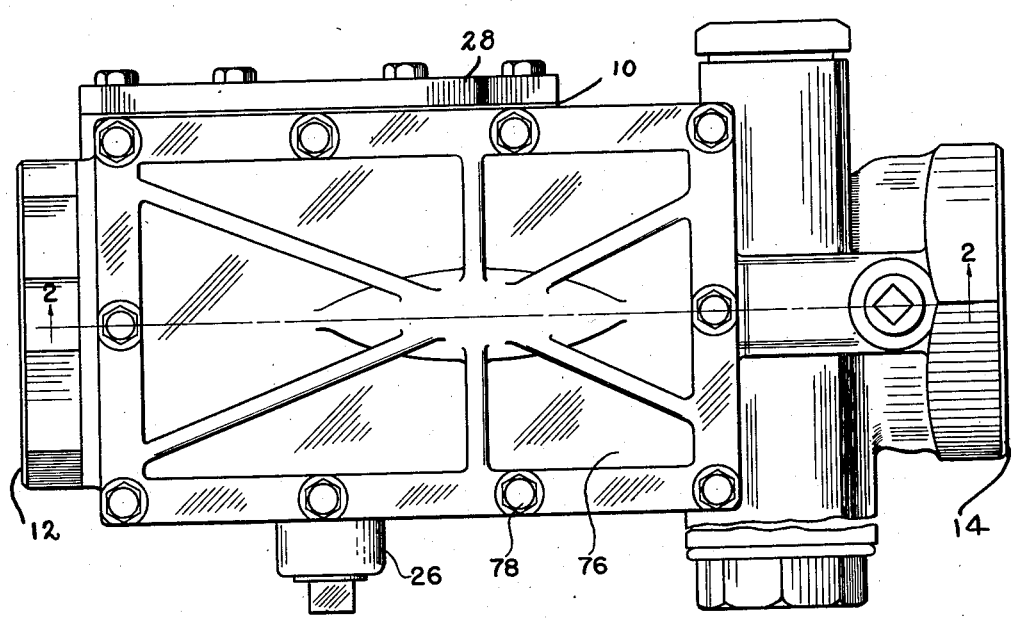
Figure 1 is a plan view of a loading valve embodying the principles of our invention.

According to this invention, a loading valve is provided which comprises two separate valve mechanisms, preferably mounted in a single valve body. These valve mechanisms comprise a swinging or clapper type valve and a sliding type valve such as a gate or plug valve.

These valves are connected in series with the plug valve, preferably on the upstream side. The clapper valve operates positively to cut off fluid flow through the flow channel of the valve, while the slidable valve member operates to attenuate the fluid flow before closing of the clapper valve and after opening thereof.

According to the preferred form which this valve takes, there is a combination of a plug type valve and a clapper type valve with a linkage interconnecting the movable members of the valves for operation in unison. In this manner a single operating lever is effective for moving the valve members between their open and closed positions, while the linkage connecting the valve members synchronizes their operation so all the initial opening movements and final closing movements of the clapper valve take place while the plug valve is closed.

According to a modified arrangement of the valve, two valve members are interconnected by gear sectors, and in this manner are caused to move in unison to the same effect as described above.

For further carrying out the objects of this invention, the clapper valve member is made in an annular form and has its central opening closed by a valve disk that has a lost motion connection with the clapper member. This valve disk opens before and closes after the clapper valve member and is useful for bleeding off the pressure upstream of the clapper valve member before the clapper valve member opens, and also permits a reduced rate of flow through the valve after the clapper valve member is closed for "topping off" operations.

The plug valve referred to previously is preferably somewhat leaky, and the leakage of fluid past the plug valve when the clapper valve member is closed and the valve disk is open is often sufficient for the said "topping off" operation. If not, the plug valve can be left slightly open and a reduced rate of fluid flow through the valve can take place in order to keep the dispensing operation in progress.

Sturctural arrangement

Referring to the drawings somewhat more in detail, Figures 1 through 4 show the preferred form which a valve according to this invention takes. In these figures it will be seen that the valve comprises a main body part 10 having an inlet 12 and an outlet 14.

Adjacent the inlet in the flow channel 16 that extends from inlet 12 to outlet 14 is the arcuate plug valve seat 18. Adjacent the outlet 14 there is the clapper valve seat 20. These valve seats face each other so that the valve members which cooperate with the seats are positioned therebetween.

Adjacent the plug valve seat 18 is an arcuate plug member or gate 22 having trunnions 24, one of which is received in a cylindrical boss 26 on one side of valve body 10, and the other of which is received in a cylindrical recess in a cover plate 28 that is bolted over access opening 30 through which the plug valve 22 is inserted into the valve body.

As mentioned previously, the plug valve member 22 or gate does not necessarily form a tight closure with seat 18, and, in fact, is preferably in rather loose engagement with the said seat, thereby to promote easy movement of the plug or gate about its trunnion supports 24 between its open and closed positions.

On the upstream side of clapper valve seat 20 is the annular clapper valve member 32 which may advantageously include the resilient ring 34 for direct engagement with seat 20.

The central opening 36 in the clapper valve member is closed by a valve disk 38 which preferably includes the resilient ring 40. Valve disk 38 has a lost motion connection with clapper valve member 32 by means of the fluted and shouldered extension member 42 that extends from the valve disk to the downstream side of the said clapper valve member.

Connected with extension 42 is an arcuate operating lever 44 that may terminate in a squared part 46 that fits over the squared intermediate part 48 of an operating shaft 50 extending transversely of the valve, as best indicated in Figure 4.

Shaft 50 extends through packing 52 at one side of the valve body and carries an operating lever 54 by means of which the shaft can be rotated on its axis. At its other end shaft 50 extends into a closed chamber 56 and carries a spring retainer 58 to which one end of a torsion spring 60 is anchored.

The other end of spring 60 engages over a lug 62 standing out from the bottom wall of the closed chamber 56. Spring 60, it will be evident, can be utilized for continuously biasing shaft 50 in a direction to draw valve disk 38 and clapper valve member 32 toward their respective seats.

It will also be evident, however, that closure member 64 for the chamber 56 can be removed and the spring retainer 58 and spring 60 either removed or adjusted as to position in order to change the operating characteristics of the valve, should it be desired.

Returning now to Figures 2 and 3, it will be seen that extension 42 on the upstream side of valve disk 38 is bifurcated for receiving the end of an arcuate link 66. Arcuate link 66 is pivotally connected with extension 42 by means of pivot pin 68 at its one end, and at its other end is pivoted to plug valve member 22 by pivot pin 70. The purpose of link 66 is to provide for movement in unison of the clapper and plug valve members but to so relate their movements that the plug valve member opens after and closes before the clapper valve member, whereby the plug valve member acts as a fluid flow controlling device and prevents the clapper valve member from opening against the full head of the system, or from being slammed shut under the full head of the system.

This provision makes the valve very easy to operate and the valve members may be positioned in any of their operative positions between full open and full closed without requiring any particular effort to move them into that position or to retain them therein.

Figure 2:
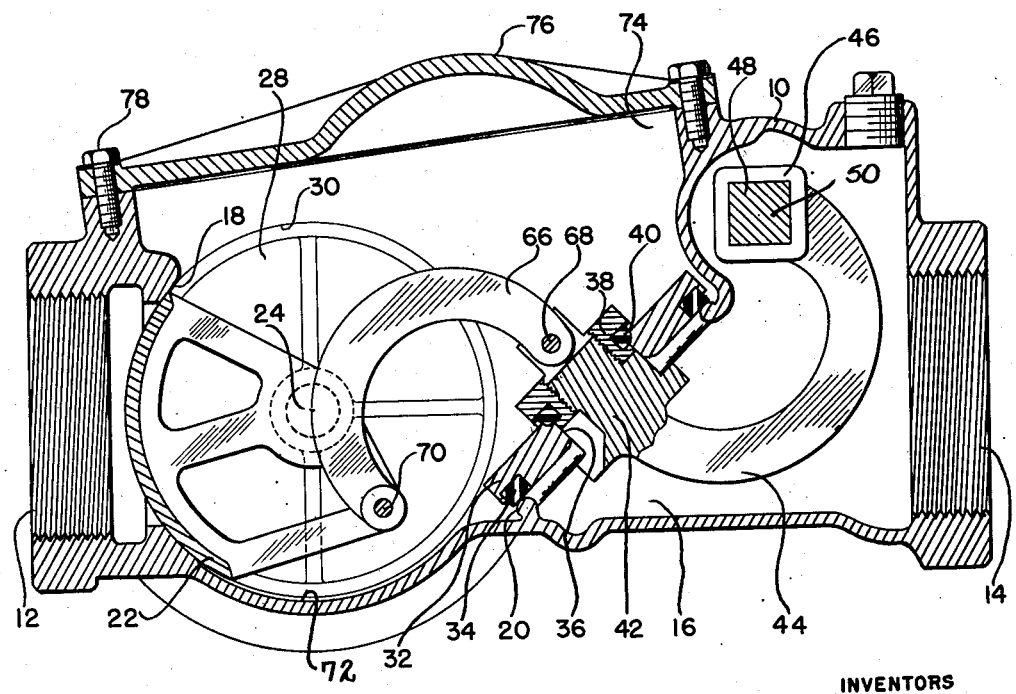
Figure 2 is a vertical section through the valve as indicated by line 2—2 on Figure 1.

In Figure 2, the valve is shown fully closed, while in Figure 3 it is shown in a partly open condition. In Figure 3 shaft 50 has been rotated about fifteen degrees, and the first five degrees of this movement are utilized for opening the valve disk 38. This opening of the valve disk bled off any pressure in the valve body between the plug valve member 22 and the clapper valve member 32, so that when the shoulder on extension 42 picked up the clapper valve member, said member offered no resistance to movement.

It will be noted in Figure 3 that the plug valve member has been turned to the point of opening, and that further rotation of shaft 50 will bring about further opening of the clapper valve member and will also commence to open the plug valve portion for substantial rates of fluid flow through the valve.

When the valve is fully open, the valve members occupy their dotted line positions in Figure 3. At this time it will be noted that the plug valve member is positioned within the recess 72 at the bottom of the valve body, while the clapper valve member is positioned well up into the top of the valve body. This leaves the flow channel through the valve wide open, except for the space occupied by the links and operating members for the valve members.

Exceedingly high rates of fluid flow can thus be had through the valve with the movable parts thereof offering substantially no restriction to the said flow.

It will also be noted that the valve body 10 has a large opening 74 in the top thereof through which the valve can be serviced, should it become necessary, thereby eliminating the necessity for removing the valve from a pipe line in order to replace worn or defective parts. Large opening 74 is, of course, closed during normal operation as by cover plate 76 retained thereon by cap screws 78.

From the foregoing, it will be seen that the valve of Figures 1 through 4 provides a number of advantageous and meritorious features. For example, when the valve is closed, it is absolutely tight, and thus prevents any leakage of fluid therethrough. At the same time, the valve can be opened quite readily due to the blocking of the fluid flow by the plug valve member and the bleeding off of fluid within the flow passage of the valve by the valve disk.

Also, due to the attenuation of fluid flow by the plug valve member, reduced rates of flow through the valve for "topping off" operations can be had, and the valve can be closed as quickly as desired without there being any slamming of the clapper valve member or any hammering pressure surges created in the system.

In the foregoing description, plug valves and clapper valves have been referred to, but it will be evident that these are not the only types of valve mechanisms that can be utilized for carrying out the teachings of this invention.

For example, in connection with the plug valve section of the loading valve, the essential feature is that the valve opens rather gradually, as contrasted to the sudden opening of the poppet valve section, and thus the function can be obtained by a gate valve or the like. Also, the hydraulic thrust on the valve member in the plug valve section is supported by the trunnions and is not transmitted to the operating lever, and a gate valve also operates in this manner by absorbing the hydraulic thrust on the guides for the valve member.

Accordingly, it is desired that gate valves and similar mechanisms having the characteristics described will be comprehended within the scope of this invention.

Similarly, in connection with the clapper valve, the essential features for this portion of the loading valve are a positive seal when the valve is closed, together with offering little restriction to fluid flow when wide open. Accordingly, it will be seen that a poppet type valve mechanism or a swing check type valve with a suitable operator for opening the valve would be adapted for functioning in a manner equivalent to the clapper valve described.

For this reason, it is intended that such equivalents of the clapper valve shall be considered to come within the scope of this invention.

It will be understood that this invention is susceptible to modification in order to adapt it to different usages and conditions, and, accordingly, it is desired to comprehend such modifications within this invention as may fall within the scope of the appended claims.

We claim:

1. In a valve: a valve body comprising a chamber defining a flow passage therein, said chamber having inlet and outlet openings at opposite ends thereof, a first valve seat at said inlet opening and a rotary valve means mounted in said chamber adjacent said seat for movement into seating engagement therewith, a second valve seat centrally positioned in said chamber and angularly disposed relative to the direction of flow through said chamber, a clapper valve in said chamber adjacent said second valve seat for movement into seating engagement therewith, a central opening in said clapper valve and a disk for closing said central opening, means for simultaneously opening and closing each of said valves relative to their seats comprising a link located within said chamber and pivotally connected to said rotary valve and to said disk, said pivoted connections lying on a line substantially parallel to the plane of said second valve seat when said disk is in said closing position, and further link means in said chamber rigidly connected to said disk and operable from outside said chamber to initiate movement of said valves, said clapper valve being mounted on said further link and being slidable relative to said disk.

2. A valve comprising a body portion defining a chamber therein, inlet and outlet openings at opposite ends of said chamber for the flow of fluid therethrough, rotary valve means disposed within said chamber adjacent said inlet opening for opening and closing the same, a valve seat in said chamber adjacent said outlet opening and disposed angularly relative to the direction of flow through said chamber, a clapper valve positioned in said chamber adjacent said valve seat for opening and closing the same, said clapper valve having a central opening therein, a valve disk mounted for closing said opening and having an extenuation member connected thereto and extending through said opening, said clapper valve being slidably mounted on said extension member and means on said extension for limiting the sliding movement of said clapper valve, means for simultaneously actuating each of said valves comprising a pair of arcuate link members disposed within said chamber, and forming substantially an S-shape relative to each other when said valves are in a closed position, one of said links being pivotally connected to said rotary valve and said disk, and the other of said links being connected to said extension member and to means operable from outside said chamber for initiating movement of said valves.

3. The combination of claim 2 wherein said chamber is provided with upper and lower walls, each of said walls having recessed portions for receiving said rotary valve and one of said arcuate links, respectively, when said valves are in the open position.

ROBERT M. CONKLIN.
HAROLD W. HERRING.

References Cited in the file of this patent

UNITED STATES PATENTS

| Number | Name | Date |
|--------|------|------|
| 910,326 | Stevenson | Jan. 19, 1909 |
| 913,121 | Frayer | Feb. 23, 1909 |
| 922,145 | Howarth | May 18, 1909 |
| 996,577 | Gamble | June 27, 1911 |
| 1,004,019 | Griffiths | Sept. 26, 1911 |
| 1,409,528 | Dickenson | Mar. 14, 1922 |
| 1,521,986 | Beaver | Jan. 6, 1925 |
| 1,705,487 | Marscheider | Mar. 19, 1929 |
| 1,713,102 | Stedwell | May 14, 1929 |
| 1,850,094 | Dean | Mar. 22, 1932 |

FOREIGN PATENTS

| Number | Country | Date |
|--------|---------|------|
| 3,916 | Great Britain | of 1876 |
| 357,735 | Great Britain | of 1931 |